March 7, 1961 J. D. LEBEL ET AL 2,974,315

SIGNAL CONVERTING SYSTEMS

Filed July 21, 1955 2 Sheets-Sheet 1

INVENTORS.
JEAN D. LEBEL
GUNTHER J. MARTIN
FRANK S. REPLOGLE JR

BY William R. Sherman

THEIR ATTORNEY

SIGNAL CONVERTING SYSTEMS

Filed July 21, 1955 2 Sheets-Sheet 2

INVENTORS.
JEAN D. LEBEL
GUNTHER J. MARTIN
FRANK S. REPLOGLE JR.
BY William R. Sherman
THEIR ATTORNEY 2,974,315
Patented Mar. 7, 1961

2,974,315

SIGNAL CONVERTING SYSTEMS

Jean D. Lebel, New Canaan, and Gunther J. Martin and Frank S. Replogle, Jr., Ridgefield, Conn., assignors, by mesne assignments, to Schlumberger Well Surveying Corporation, Houston, Tex., a corporation of Texas Filed July 21, 1955, Ser. No. 523,596

9 Claims. (Cl. 340—347)

Figure 1:
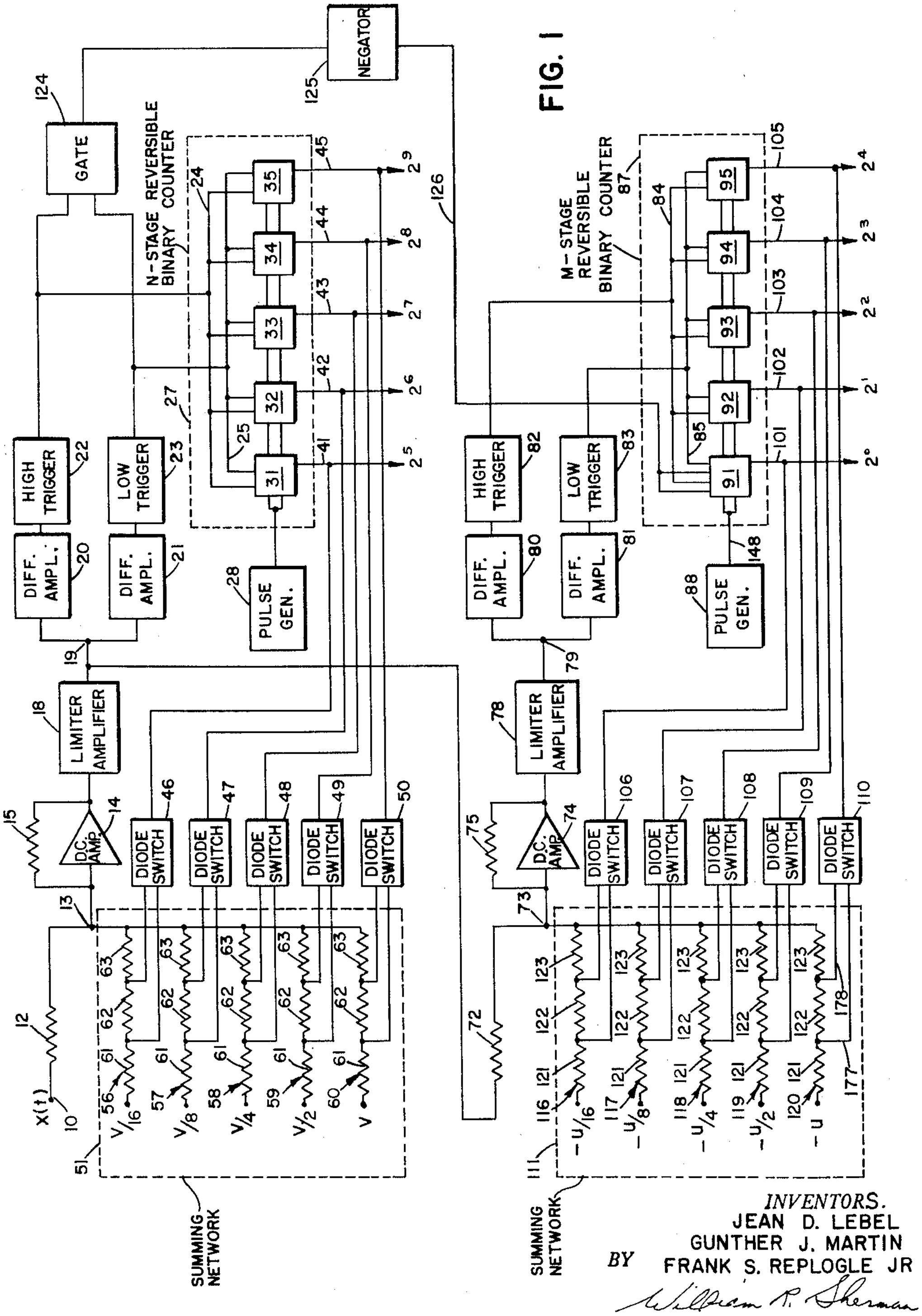

This invention relates to signal converting systems and, more particularly, to systems for converting signals into permutation coded pulses such as pulses coded in the simple addition binary code.

In a variety of information handling systems, conversion of a variable amplitude signal into a pulse code, such as the simple addition binary code, allows an accurate and speedy handling of the information in two-state devices and associated pulse circuitry. Provided that the conversion is accomplished with high speed and accuracy, the advantages attending a representation of information by coded pulse groups may be realized.

In proposed systems for conversion of a variable amplitude or analog signal into a pulse-coded or digital signal, accuracy of conversion has generally been sacrificed to attain a reasonable speed of conversion. One system which affords a speedy conversion utilizes a feedback circuit to force the value registered by a binary counter into coded correspondence with an input analog signal. In this system, a signal having an amplitude which represents the setting of the counter is balanced against the input analog signal to obtain an error voltage for controlling the direction and extent of counting by the counter. When the setting of the counter corresponds most nearly with the input analog signal, the setting represents the converted value of the analog signal. Proposed systems of this character generally use a five-digit binary code. As a binary code is capable of representing $2^n$ discrete values where $n$ is the number of digits in the code, a five-digit code permits a representation of 32 different values. When the range through which an analog signal may vary is divided into 32 equal steps by a process of quantization, it will be evident that the coded representation of the analog signal may be inaccurate by one part in 32.

If in an endeavor to increase the achievable limits of accuracy for such systems the number of digits is increased, not only the counting time but also the time for deriving an error signal may be increased. The conversion time may, if the counting rate remains the same, be increased by a factor as high as $2^m$ where $m$ is the number of additional digits. Since the frequency of conversion preferably is substantially higher than the highest frequency component in a signal to be converted, any increase in the time required for a conversion imposes a serious limitation upon the applications of a signal converting system. For example, a system with a slow rate of conversion cannot accurately follow an input signal which has step changes in value.

It is an object of the invention, therefore, to provide new and improved signal converting systems which accommodate additional increments of quantization without a commensurate increase in conversion time.

Another object of the invention is to provide new and improved signal converting systems for accurate conversion of signals having relatively high frequency components or step changes.

Still another object of the invention is to provide new and improved signal converting systems operative continuously to provide a coded representation of an analog signal with a high degree of accuracy.

Yet another object of the invention is to provide new and improved signal converting systems for registering $m$ low order digits of a binary coded signal separately from $n$ high order digits.

These and other objects are attained, in accordance with the invention, by quantizing an analog signal into coarse increments of value, further quantizing the difference between the analog signal and the value of its coarse quantization, and coding each quantized value. The coarse quantization is represented in binary form by the setting of an $n$-stage binary counter. In accordance with the setting of this counter, a coarsely quantized signal is obtained for balancing against the input analog signal to obtain a coarse error signal. This coarse error signal is then employed for controlling the $n$-stage counter. The coarse error signal is, in turn, quantized into fine increments represented in binary coded form by the setting of an $m$-stage binary counter. Once the $n$-stage counter has settled, the $m$-stage counter is brought into correspondence with the coarse error signal by balancing thereagainst a quantized representation of the count in the $m$-stage counter. While the conversion to obtain a coarse quantization is relatively slow in order that an accurate comparison can be made corresponding to the accuracy which the overall quantization of $n+m$ affords, the conversion of the coarse error signal into a fine quantized value is effected with a substantially greater rapidity.

Figure 2:
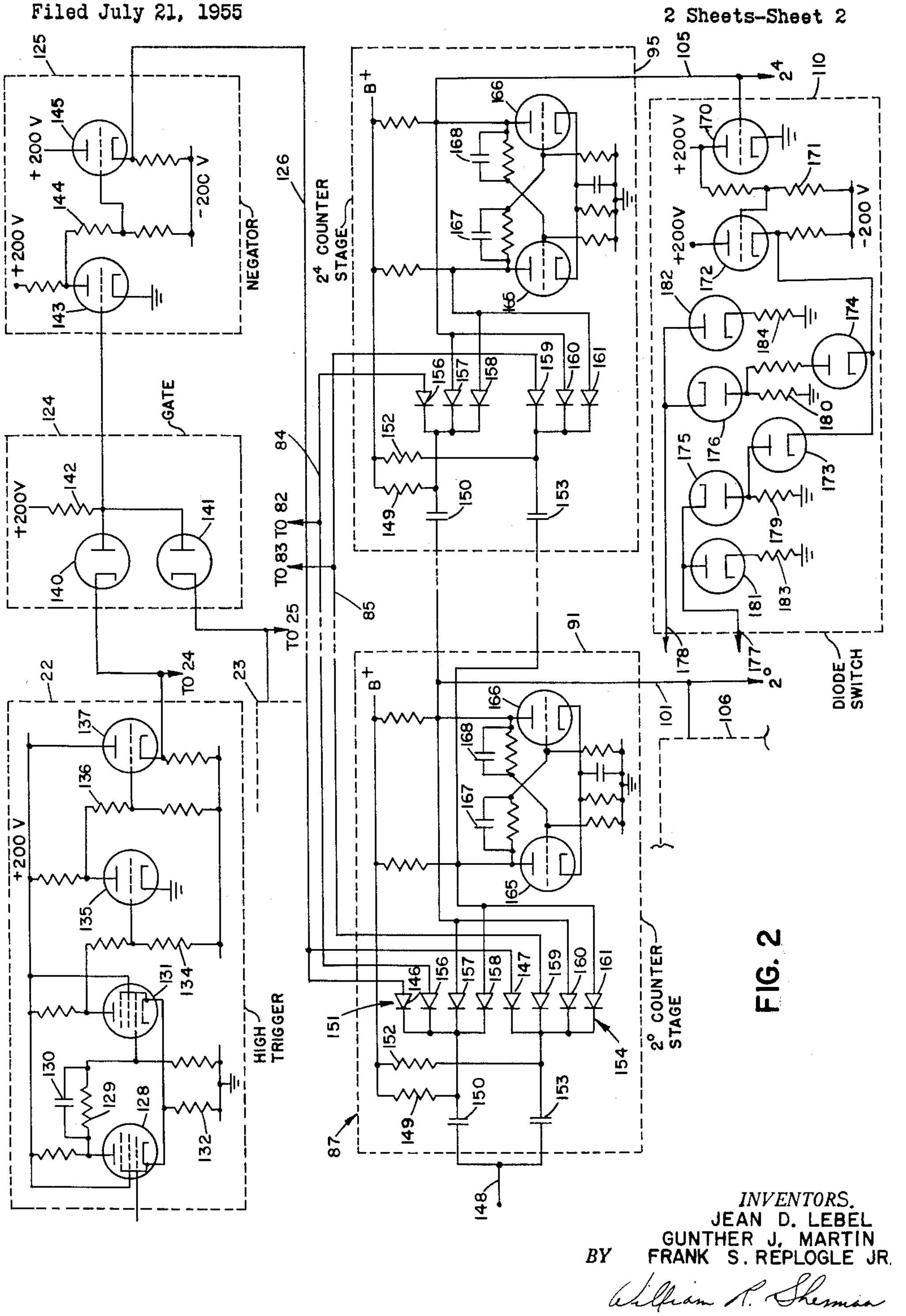

Additional objects and advantages of the invention will become apparent from the following detailed description of a representative embodiment thereof, taken in conjunction with the accompanying drawings, in which:

Fig. 1 is a block diagram of a signal converting system constructed in accordance with the invention; and Fig. 2 is a circuit diagram of portions of the system of Fig. 1.

In Fig. 1 there is shown a system for converting into a binary coded form an analog signal $x(t)$, which may have both continuous and step changes in amplitude. The binary coded output of the system comprises $n$ digits derived in a coarse quantization of the analog signal and $m$ digits representing a "vernier" or fine quantization of the analog signal. While the number of digits $n$ and $m$ in the coarse and fine portions of the binary code group may be varied over a considerable range in various designs, for a conversion accuracy of approximately 0.1% there may be five digits in both the coarse and the fine portions for a total quantization of $2^{10}$ or 1,024. The quantization into coarse and fine increments is achieved in coarse and fine conversion loops, respectively, these loops being arranged in cascade. In each of these conversion loops are incorporated the teachings of application Serial No. 516,868, filed June 21, 1955, by G. Martin for "Signal Converting Systems" and assigned to the assignee hereof. Reference is made to this copending application for details of construction and operation which may further an understanding of the present invention.

The analog signal $x(t)$ is applied at a terminal 10 to a coupling resistor 12 having connection at a junction point 13 to the input of a D.C. operational amplifier 14. This D.C. amplifier 14 in a preferred embodiment is drift stabilized. Between its output and its input is connected an inverse feedback circuit including resistor 15 with a value, for example, of one megohm. The output of the D.C. amplifier 14 is further coupled through a limiter amplifier 18 to an arrangement for determining the coarse code group in response to the signal output from the D.C. amplifier 14.

This arrangement comprises, more particularly, differential amplifiers 20 and 21 having their inputs in parallel connection at junction 19 with the limiter amplifier 18. While conventional circuitry may be employed in the limiter amplifier 18 as well as in the differential amplifiers 20, 21, a preferred design is shown and described in the above-mentioned application Serial No. 516,868. The differential amplifiers 20, 21 are coupled, respectively, to a high trigger 22 and a low trigger 23.

In accordance with the design of the differential amplifiers, a spread in the error signal levels for triggering is provided which introduces a stabilizing hysteresis into the coarse conversion loop. Thus, a change in the counter setting in response to a positive error signal does not result in a negative error signal sufficient to actuate low trigger 23.

The signal outputs of these triggers 22, 23 are supplied to forward and reverse buses 24, 25 of a reversible *n*-stage binary counter 27. Energization of one of buses 24, 25 not only determines the direction of counting but also allows counting to proceed. The outputs of both triggers 22, 23 have the same polarity (i.e., positive) only when the count correctly corresponds to the input signal $x(t)$. Either one or the other but not both of the buses 24, 25 may be energized negatively then to determine the direction of counting, but when neither bus is energized (i.e., when both are positive) counting ceases. Periodic actuating pulses are supplied to the counter 27 by means of a pulse generator 28 which may, for example, be an astable multivibrator.

For a representation of the coarse value of the analog input signal by five binary digits, the binary counter 27 has five cascaded stages 31–35 with corresponding output lines 41–45. The stages 31–35 may have a variety of suitable forms, a convenient form being shown in Fig. 2 and described hereafter in connection with an *m*-stage counter. Briefly, each stage comprises cross-coupled electron tubes forming a bistable multivibrator and diodes coupled to form counting gates. These gates are energized alternatively in accordance with energization of buses 24 and 25 by the triggers 22, 23. In the first stage 31, only one of these counting gates may be opened at a given instant to admit negative pulses from the pulse generator 28. The counting gates of the succeeding stages 32–35 are selectively opened to couple carry pulses from the preceding stage to the anode circuits of the cross-coupled electron tubes. Each forward counting gate is adapted to pass carry pulses representing a transition from the binary state 1 to the state 0 for the preceding stage, while each backward counting gate is adapted to pass carry pulses representing a reverse transition of states. In accordance with the logic of the binary code, the binary counter 27 is thus conditioned for forward counting when a negative pulse is applied to the forward counting bus 24 by the high trigger 22 and is conditioned for backward counting when a negative pulse is applied to the backward counting bus 25 by the low trigger 23.

Continuously in correspondence to the binary output of *n*-stage counter 27 there is provided a quantized signal representing this output for balancing against the input signal $x(t)$. This quantized signal is obtained by a connection of output lines 41–45 for the counter 27 to corresponding shunt diode switches 46–50 which control a current summing network 51. In Fig. 2 a suitable form for such switches 46–50 is shown, which is described hereafter. The summing network 51, as seen in Fig. 1, comprises a plurality of resistance circuits 56–60 each including three series resistors 61, 62, 63 having a common junction at the junction point 13. Applied to the respective resistance circuits 56–60 are potentials in the proportion of 32, 64, 128, 256 and 512 which may be derived from a reference potential source. The currents flowing through the resistance circuits are thereby fixed at values corresponding to the binary orders of the output lines 41–45, namely, $2^5$, $2^6$, $2^7$, $2^8$, and $2^9$. Each of switches 46–50, when the corresponding output line is in its 0 state, effectively grounds the junction points of resistors 61–63 in the corresponding resistance circuit, so that the fixed current corresponding to an output line in the 0 state is not added at the junction 13. Only the currents corresponding to output lines in the 1 state are thus added, these currents having a polarity such that the quantized value which they represent is balanced against the input signal $x(t)$. With a positive input signal $x(t)$ and with resistors 61, 62, 63 valued at 0.5, 0.5 and 1.0 megohm, respectively, negative potentials for circuits 56–60 running from $-V/16$ volts to $-V$ volts may be applied to the resistance circuits, where "V" is a suitable scale factor.

A coarse error signal is then provided by the D.C. amplifier 14 corresponding to an algebraic summation of currents at junction 13. This error signal may be extracted from the coarse conversion loop at any suitable point such as point 19 following the limiter amplifier 18. The amplified error signal at point 19 is coupled to the fine conversion loop by a resistor 72 having connection at junction point 73 with the input of a D.C. amplifier 74. D.C. amplifier 74 is similar to amplifier 14 in having an inverse feedback circuit including a resistor 75, but differs in having a substantially higher frequency response. This higher frequency response in fact characterizes the entire fine conversion loop. In other respects, the elements of the fine conversion loop correspond to similar elements in the coarse conversion loop.

In the fine conversion loop, D.C. amplifier 74 is coupled via limiter amplifier 78 to an output junction 79 which affords parallel connection to the inputs of differential amplifiers 80 and 81. These differential amplifiers 80, 81 are coupled respectively to high and low triggers 82, 83 for energizing forward and reverse counting buses 84, 85 of a reversible *m*-stage binary counter 87. This counter 87 is periodically actuated by a pulse generator 88 similar to pulse generator 28 but affording a substantially higher pulse counting rate. For example, the pulse counting rate for counter 87 may be 50,000 c.p.s. while that of counter 27 is 8,000 c.p.s.

Where the input signal $x(t)$ is to be quantized into $2^{10}$ parts, the counter 87 suitably has five stages 91–95. Output lines 101–105 individual to the five stages 91–95 of the counter 87 couple with corresponding shunt diode switches 106–110 serving selectively to control summation of fixed currents in a summing network 111. The fixed currents in the summing network 111, which are supplied to the junction point 73, are in the proportion of 1, 2, 4, 8, and 16 corresponding to the respective orders $2^0$, $2^1$, $2^2$, $2^3$, and $2^4$ of the counter output lines 101–105. To this end, network 111 includes five parallel resistance circuits 116–120 each comprising series resistors 121–123 which may be 0.5, 0.5 and 1.0 megohm, respectively. Negative potentials applied to circuits 116–120 may range from $-U/16$ volts to a $-U$ volts, where "U" may be a scale factor different from "V."

Since the coarse conversion of the analog input signal $x(t)$ may be utilized even when the fine conversion is out of step, the *n*-stage counter is continuously driven into correspondence with the analog signal. Provision is made for inhibiting the fine conversion loop until the coarse conversion loop has settled at the correct counter setting, taking advantage of random probabilities for a speedy fine conversion. To this end, a gate circuit 124 is provided having two inputs coupled, respectively, to the high trigger 22 and the low trigger 23. The gate circuit 124 is adapted, upon the coincidence of positive input pulses from the triggers 22, 23, to supply a positive pulse to the negator 125, which more commonly may be referred to as a "NOT" circuit. The negator 125 may be characterized as providing a positive pulse output for a negative pulse input and a negative pulse output for a positive pulse input. The negator 125, in turn, is connected via inhibitor line 126 to the first stage 91 of the binary counter 87. This connection provides for the inhibition of counting in either direction by the *m*-stage counter 87 until the coarse conversion loop has settled.

Referring now to Fig. 2, the high trigger 22 is shown more particularly to comprise an input pentode 128 having its anode coupled by a resistor 129 and capacitor 130 in parallel to the control grid of an output pentode 131. To facilitate a triggering action, the pentodes 128, 131 have a common cathode resistor 132. The output pentode 131 is coupled via a potential divider 134 to a phase inverter 135. The phase inverter 135 is, in turn, coupled by a voltage divider 136 to a cathode follower 137. In a preferred design, the low trigger 23 is substantially identical to the high trigger 22.

The high and low triggers 22, 23, in addition to their respective connection with the forward and backward counting buses 24, 25 in the binary counter 27, have connections through the gate circuit 124 and negator 125 to the counter 87 to inhibit the same until the counter 27 has settled. As shown in Fig. 2, the gate 124 may conveniently comprise a pair of diodes 140, 141 having their anodes connected in common to a potential dropping resistor 142 and having their cathodes coupled to the respective cathode follower outputs of the high and low triggers 22, 23. By this connection of the diodes 140, 141, a concurrence of positive output signals from the triggers 22, 23 results in a positive output signal from the gate 124. Otherwise, the output of the gate 124 will be a negative potential corresponding to the negative potential output of either of trigger circuits 22, 23.

Negator 125 to which the output of the gate 124 is coupled comprises a phase inverter 143 coupled by a potential divider 144 to a cathode follower 145. The phase inverter 143 may otherwise be described as a single stage amplifier having negative-unity gain. The cathode follower 145 may, on the other hand, afford a unity gain which is positive. The output of the cathode follower 145 is connected by line 126 to the anodes of a pair of diodes 146, 147 in the first stage 91 of the binary counter 87. As each of the succeeding stages 92–95 of the counter may be identical in form, only the first 91 and the last 95 of the stages are shown for convenience of representation.

The first stage 91 is coupled with the pulse generator 88 via an input conductor 148 to receive therefrom a train of square wave pulses alternating in polarity. To sharpen these pulses, resistance 149 and capacitor 150 form a differentiating circuit preceding a forward counting gate 151. Resistor 152 and capacitor 153 provide a parallel differentiating circuit coupling conductor 148 with a backward counting gate 154. The forward counting gate 151 comprises three diodes 156, 157, 158 in addition to diode 146, each of which may be of the semiconductor type having their cathodes connected in common to the junction of resistor 149 and capacitor 150. Similarly, the backward counting gate 154 comprises three diodes 159, 160, 161, in addition to diode 147, each of the semiconductor type and having their cathodes connected to the junction of resistor 152 and capacitor 153. To determine the periods of counting, diode 156 has its anode connected to a forward counting bus 84 energized by the high trigger 82, while the anode of diode 159 is coupled to the backward counting bus 85 alternatively energized by the low trigger 83. Thus, energization of the inhibiting line 126 determines whether counting may occur.

Energization of either of buses 84, 85, however, determines not only the period but also the direction in which counting may occur in the fine conversion loop. Thus, depending upon the open or closed condition of the counting gates 151, 154, diodes 157, 158 or diodes 160, 161 couple the clock pulses from generator 88 to the anode circuits of cross-coupled triodes 165, 166 comprising a bistable multivibrator. This cross-coupling is effected by parallel resistance-capacitance circuits 167, 168 serving to couple the respective anodes of triodes 165, 166, to the control grid of the other tube. In view of this cross-coupling, whichever grid has been held positive by the non-conductance of the other tube is driven negatively by the application of a gated negative-going counting pulse to the anodes of both triodes. Accordingly, the conducting triode is driven to cutoff and its rising anode potential is coupled to the control grid of the other triode, thereby reversing the states of conductance and non-conductance of the triodes.

Output line 101 of the first stage 91 of binary counter 87 is connected to the anode of the second triode 166. The succeeding output lines 102–105 are similarly connected to the anodes of the second triodes. When any of these second triodes 166 are non-conducting, thus representing the 1 state of the particular stage, the associated output line will be at a high potential approaching that of the B+ supply for the counter. The zero state of any stage is represented by a more negative voltage on its output line corresponding to the anode potential of the second triode 166 when such triode is conducting. As the anode of triode 166 is coupled to the forward counting gate 151 of the next stage, a negative carry pulse will occur only with a drop in anode potential, that is, a 1 to 0 transition. Contrarily, a negative carry pulse is coupled from the anode of triode 165 to the downwardly counting gate 154 for a 0 to 1 transition. Conveniently, binary counter 27 may have a construction identical to this counter 87, absent the inhibition line 126 and connected diodes 146, 147.

As each of shunt diode switches 106–110, as well as switches 56–60, may have identical circuitry, each is represented by the illustrated circuitry of diode switch 110 having connection with counter output line 105. Such switch comprises an inverter tube 170 coupled via a potential divider 171 with a cathode follower 172. Coupling diodes 173, 174 connect the output of the cathode follower 172 with respective switching diodes 175, 176. By means of conductors 177, 178, these switching diodes 175, 176 are connected to the respective junctions of resistors 121, 122 and resistors 122, 123 of the associated resistive circuit 120. In series with the switching diodes 175, 176 are resistors 179, 180 affording connection to ground. Both the coupling diodes 173, 174 and switching diodes 175, 176 are similarly poled relative to ground, the switching diodes being poled in the direction of easy conduction. In parallel with the respective switching diodes 175, 176 are oppositely poled compensating diodes 181, 182 together with respective series resistors 183, 184 connecting with ground. For further details of the construction of the shunt diode switches, reference is made to aforementioned application Serial No. 516,868.

In an operation of the system illustrated in Figs. 1 and 2 to exemplify the principles of this invention, a signal wave $x(t)$ which may vary sharply as a function of time is applied to the input terminal 10. This input signal wave is coupled by the high resistance 12 to the junction point 13, to which is also coupled a quantized signal of opposite polarity representing the coarse setting of the binary counter 27. The difference of these signals represents a coarse error signal which is linearly reproduced at the output of operational amplifier 14. As described in aforementioned application Serial No. 516,686, the amplifier 18 amplifies the error signal by a substantial gain, such as a gain of 10, while limiting the signal applied at point 19 to a value sufficient to produce a triggering action of the high or low trigger.

In order that the coarse conversion loop may settle at a setting of the binary counter 27 most nearly approximating the input wave signal $x(t)$, the differential amplifiers 20, 21 are adjusted to actuate the high or low trigger 22, 23, respectively, only when the potential at point 19 exceeds, or is less than a certain potential increment. This potential increment corresponds with an error signal slightly greater than that representing a unit change in the setting of the counter 27. So long as the error signal at the point 19 lies outside this potential increment, a negative potential will be applied by the triggers 22, 23 to either the forward counting bus or the backward counting bus depending upon the polarity of the error signal. Accordingly, one of the counting buses 24, 25 is energized negatively to gate negative pulses derived from the pulse generator 37 into the first stage 31 of the counter 27 and carry pulses into the succeeding stages 32–35 of the counter.

In order that the quantized signal furnished by the summing network 51 to the input of D.C. amplifier 14 may at all times represent the setting of the binary counter 27, the summation of currents in the network is continuously under selective control by the switches 46–50. When any stage of the counter is in a 1 state, the corresponding switch passes to the summation point a current representing by its magnitude the value associated with the stage in the counter. When the output of any stage represents a 0, the corresponding diode switch grounds the resistance circuit which it controls, whereby the value associated with that stage in the counter is not added at the summation point 13. Thus, the diode switches 46–50 together with the summing network 51 effect a digital-to-analog conversion of the binary counter output. As this converted quantized signal is applied in an inverse feedback relationship at point 13, the binary counter 27 is forced into a setting which corresponds with a minimum coarse error signal.

This minimum coarse error signal corresponds with a settled condition of the coarse conversion loop of the system. That is, a minimum coarse error signal is obtained when the binary counter 27 has a setting representing the input wave signal $x(t)$ within the limits of accuracy afforded by the coarse steps of quantization. The error signal at the point 19 is then insufficient to cause either of the differential amplifiers 20, 21 to actuate high or low triggers 22, 23. The triggers 22, 23, therefore, have positive signal outputs which close both the forward and backward counting gates of binary counter 27. Settling of the coarse conversion stage is represented, then, by a positive output from each of triggers 22, 23 and is accompanied by inhibition of the binary counter 27.

With a concurrence of positive outputs from the triggers 22, 23, there is derived from the coincidence gate 124 a positive signal which is applied to the control grid of phase inverter 143 in the negator or "NOT" circuit 125. The phase inverter 143 then provides a negative output signal to the cathode follower 145 which is coupled by the latter to the inhibiting line 126 associated with the binary counter 87 of the fine conversion loop. When the inhibiting line 126 is changed from a positive to a negative potential, inhibiting action is terminated. That is, with the bus 126 at a negative potential, the common junctions of the diodes in both the forward and the backward counting gates 151 and 154 for the first stage 91 of the counter 87 may be driven negatively by counting pulses, whereby such pulses may be coupled through to the anode circuits of the multivibrators in the first and succeeding stages 91–95.

Since the fine conversion loop has an operation substantially identical with the coarse conversion loop except for having a higher conversion rate, its operation will be understood from the foregoing description of a coarse conversion. It may be noted, however, that the input signal to the fine conversion loop is a version of the coarse error signal. By deriving the coarse error signal at point 19 following the limiter amplifier 18, a swamping of the fine conversion stage by signals in excess of that to which it is capable of responding is avoided. At the same time, the error signal is applied to the fine conversion stage at a sufficiently high level to obtain a good signal-to-noise ratio and to minimize the effects of drifts in the D.C. amplifier 74 and the limiter amplifier 78.

Since the states of the five stages 31–35 of binary counter 27 represent the five higher orders of a ten digit code group, whereas the states of the stages 91–95 in the binary counter 88 represent the five lower orders of the code group, the outputs of the counters 27, 87 may be separately utilized. For example, the output of the high order or coarse counter may be used for selection of a matrix point in a function generator (not shown) while the output of the vernier counter 87 is used for interpolation. In such application, interpolation may occur during intervals when the counter 87 is inhibited, the setting of the counter 27 meanwhile being adjusted for selection of another matrix point. Because the rate of effecting conversion in the fine conversion loop substantially exceeds the rate for the coarse conversion loop, the coarse conversion loop may accept rapidly varying input signals and yet remain settled for a sufficient interval to allow the fine conversion loop likewise to settle.

To exemplify the speedy operation afforded by the system of this invention, the frequency of the counting pulses for the coarse stage counter 27 and fine stage counter 87 may be taken as 8000 and 50,000 cycles per second, respectively. To count through the full range of the counters from a cleared state requires 4 milliseconds for settling of the coarse conversion stage and .66 millisecond for settling of the fine conversion stage, or a total counting time of 4.66 milliseconds. A ten stage counter operating at 8000 cycles per second would require 128 milliseconds, or almost twenty-seven times longer for counting through its full range. Moreover, the lag time for the converted output of this cascaded signal conversion system relative to the applied input signal is found to be on the order of 7 milliseconds whereas a comparable ten-digit conversion system may have on the order of 24 milliseconds average lag time.

While the embodiment of the invention herein shown and described provides a highly affective signal conversion system it will be evident that various modifications in form and design may be made within the principles of the invention. Thus, in lieu of the diode switches and summing networks utilized for an analog-to-digital conversion, there may be substituted a variety of other arrangements for digital-to-analog conversion. Similarly, the balancing of the quantized feedback signal against the input to each of the conversion stages may be effected by means other than a D.C. operational amplifier such as, for example, a differential amplifier. If desired, additional conversion loops may be cascaded in a relationship similar to that existing between the fine conversion loop and the coarse conversion loop of the illustrated embodiment. In the latter modification, a coincidence gate may be employed to inhibit operation of a succeeding stage until a preceding stage settles. Provision may be made, if desired, for gating off both binary counter outputs until both loops are settled.

Inasmuch as the invention is subject to these and other modifications lying within its true scope and principles, the invention is not intended to be limited to the specific embodiment shown and described, but is of a scope defined in the appended claims.

We claim:

1. In an analog-to-binary signal converting system, the combination comprising an $n$-stage binary counter circuit for registering the higher order digits of a binary number, an $m$-stage binary counter circuit for registering lower order digits of said number, circuit means responsive exclusively to the setting of said $n$-stage counter and to an analog input signal to be converted for generating a coarse error signal, circuit means responsive to the setting of said $m$-stage counter and to said coarse error signal for generating a fine error signal, circuit means for periodically actuating said $m$-stage counter circuit at a rate substantially greater than said $n$-stage counter circuit, circuit means responsive exclusively to said coarse error signal for controlling the actuation of said $n$-stage counter, and circuit means responsive to said fine error signal for controlling the actuation of said $m$-stage counter.

2. In an analog-to-binary signal converting system, the combination comprising an $n$-stage binary counter circuit for registering the higher order digits of a binary number, an $m$-stage binary counter circuit for registering lower order digits of said number, circuit means responsive exclusively to the setting of said $n$-stage counter and to an analog input signal to be converted for generating a coarse error signal, circuit means responsive to the setting of said $m$-stage counter and to said coarse error signal for generating a fine error signal, pulse generator circuit means for periodically actuating said $m$-stage counter circuit at a rate substantially greater than said $n$-stage counter circuit, circuit means continuously responsive to said coarse error signal for controlling the direction and extent of counting by said $n$-stage counter, and circuit means responsive to said fine error signal for controlling the direction and extent of counting by said $m$-stage counter.

3. In an analog-to-binary signal converting system, the combination comprising an $n$-stage binary counter circuit for registering the higher order digits of a binary number, an $m$-stage binary counter circuit for registering lower order digits of said number, circuit means responsive to the setting of said $n$-stage counter for generating a coarse feedback signal quantized to correspond with the $n$ digits registered thereby, circuit means for balancing said coarse feedback signal with an analog input signal to be converted to derive a coarse error signal, circuit means responsive to the setting of said $m$-stage counter for generating a fine feedback signal quantized to correspond with the $m$ digits registered thereby, circuit means for balancing said fine feedback signal against said coarse error signal to derive a fine error signal, circuit means for periodically actuating said $m$-stage counter circuit at a rate substantially greater than said $n$-stage counter circuit, and circuit means selectively responsive to said fine and said coarse error signals, respectively, for controlling the actuation of said $m$-stage and said $n$-stage counters.

4. In a signal converting system, the combination as recited in claim 3 wherein each of said feedback signal generating circuit means includes a resistive current summing network for adding currents fixed in magnitude to correspond with the values of the digits and a shunt diode switch for each stage of the corresponding counter for selectively controlling the addition of said currents in accordance with the states of said stages.

5. In a signal converting system, the combination as defined in claim 4 wherein each of said signal balancing circuit means comprises a D.C. operational amplifier.

6. In an analog-to-binary signal converting system, the combination comprising an $n$-stage binary counter circuit for registering the higher order digits of a binary number, and an $m$-stage binary counter circuit for registering lower order digits of said number, circuit means responsive to the setting of said $n$-stage counter and to an analog input signal to be converted for generating a coarse error signal, circuit means responsive to the setting of said $m$-stage counter and to said coarse error signal for generating a fine error signal, circuit means for periodically actuating said $m$-stage counter circuit at a rate substantially greater than said $n$-stage counter circuit, circuit means continuously responsive to said coarse error signal for controlling the actuation of said $n$-stage counter, circuit means responsive to said fine error signal for controlling the actuation of said $m$-stage counter, and circuit means responsive to the coarse error signal for inhibiting the actuation of said $m$-stage counter during actuation of said $n$-stage counter.

7. In an analog-to-binary signal converting system, the combination comprising an $n$-stage reversible binary counter circuit for registering the higher order digits of a binary number, an $m$-stage reversible binary counter circuit for registering lower order digits of said number, circuit means responsive to the setting of said $n$-stage counter and to an analog input signal to be converted for generating a coarse error signal, circuit means responsive to the setting of said $m$-stage counter and to said coarse error signal for generating a fine error signal, a first pulse generator circuit for periodically actuating the $n$-stage counter circuit at a first rate, a second pulse generator circuit for periodically actuating the $m$-stage counter circuit at a second rate substantially greater than said first rate, circuit means responsive to said coarse error signal for generating a pair of control signals which differ in polarity to determine the direction of counting by said $n$-stage counter and are identical in polarity when its counting is to be terminated, circuit means responsive to said fine error signal for determining the direction and extent of counting of said $m$-stage counter circuit, and circuit means responsive to said control signals for inhibiting counting by said $m$-stage counter when said control signals are opposite in polarity.

8. In an analog-to-binary signal converting system, the combination comprising a coarse conversion loop and a fine conversion loop, each loop being separate and distinct from the other and capable of operating independently of the other, each of said loops including a multistage reversible binary counter circuit, a pulse generator circuit for supplying actuating pulses to said counter circuit, high and low triggering circuit means for alternatively gating said actuating pulses into said counter and for controlling the direction of counting, circuit means responsive to the setting of said counter circuit for generating a quantized analog signal representative thereof, circuit means for balancing said quantized analog signal against an analog input signal to derive an error signal, and circuit means for energizing said high and low trigger circuit means alternatively in response to the polarity of said error signal whenever the magnitude of said error signal exceeds a prescribed value, the counter circuits for said coarse and fine conversion loops being adapted to register the high and low order digits respectively of a binary number, the pulse generator circuit for the fine loop being constructed to operate at a substantially higher frequency than the pulse generator circuit for the coarse loop, the system further including circuit means for supplying an input analog signal to be converted to the balancing circuit means of the coarse loop to serve as the input signal thereof, and circuit means for supplying the error signal of the coarse loop to the balancing circuit means of the fine loop to serve as the input signal thereof.

9. In an analog-to-binary signal converting system, the combination comprising a coarse conversion loop and a fine conversion loop, each loop being separate and distinct from the other and capable of operating independently of the other, each of said loops including a multistage reversible binary counter circuit, a pulse generator circuit for supplying actuating pulses to said counter circuit, high and low trigger circuit means for alternatively generating a signal of given polarity to gate said actuating pulses into said counter and for controlling the direction of counting, circuit means responsive to the setting of said counter circuit for generating a quantized signal analog representative thereof, circuit means for balancing said quantized analog signal against an analog input signal to derive an error signal, and circuit means responsive to said error signal for energizing said high and low trigger circuit means alternatively in accordance with its polarity to generate a signal of said given polarity whenever the magnitude of said error signal exceeds a prescribed value, the counter circuits for said coarse and fine loops being adapted to register the high and low order digits respectively of a binary number, the pulse generator circuit for the fine loop being constructed to operate at a substantially higher frequency than the pulse generator circuit for the coarse loop, the system further including circuit means for supplying an input analog signal to be converted to the balancing circuit means of the coarse loop to serve as the input signal thereof, circuit means for supplying the error signal of the coarse loop to the balancing circuit means of the fine loop to serve as the input signal thereof, and circuit means responsive to the signals derived from said trigger circuit means for inhibiting actuation of the counter circuit for said fine conversion loop whenever the signals derived from the trigger circuit means of said coarse conversion loops are of opposite polarity.

References Cited in the file of this patent

UNITED STATES PATENTS

| | | |
|---|---|---|
| 2,497,961 | Shaw | Feb. 21, 1950 |
| 2,547,035 | McWhirter et al. | Apr. 3, 1951 |
| 2,560,124 | Mofenson | July 10, 1951 |
| 2,568,724 | Earp | Sept. 25, 1951 |
| 2,717,994 | Dickinson | Sept. 13, 1955 |
| 2,754,503 | Forbes | July 10, 1956 |
| 2,775,754 | Sink | Dec. 25, 1956 |
| 2,796,314 | Bishop | June 18, 1957 |
| 2,836,356 | Forrest | May 27, 1958 |
| 2,869,115 | Doeleman | Jan. 13, 1959 |